April 11, 1967 W. E. BIXBY 3,313,623
LINE SEQUENTIAL COLOR XEROGRAPHY
Filed Sept. 5, 1961
2 Sheets-Sheet 1
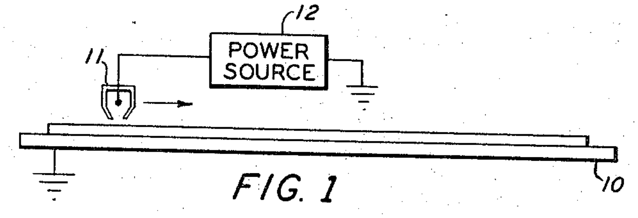
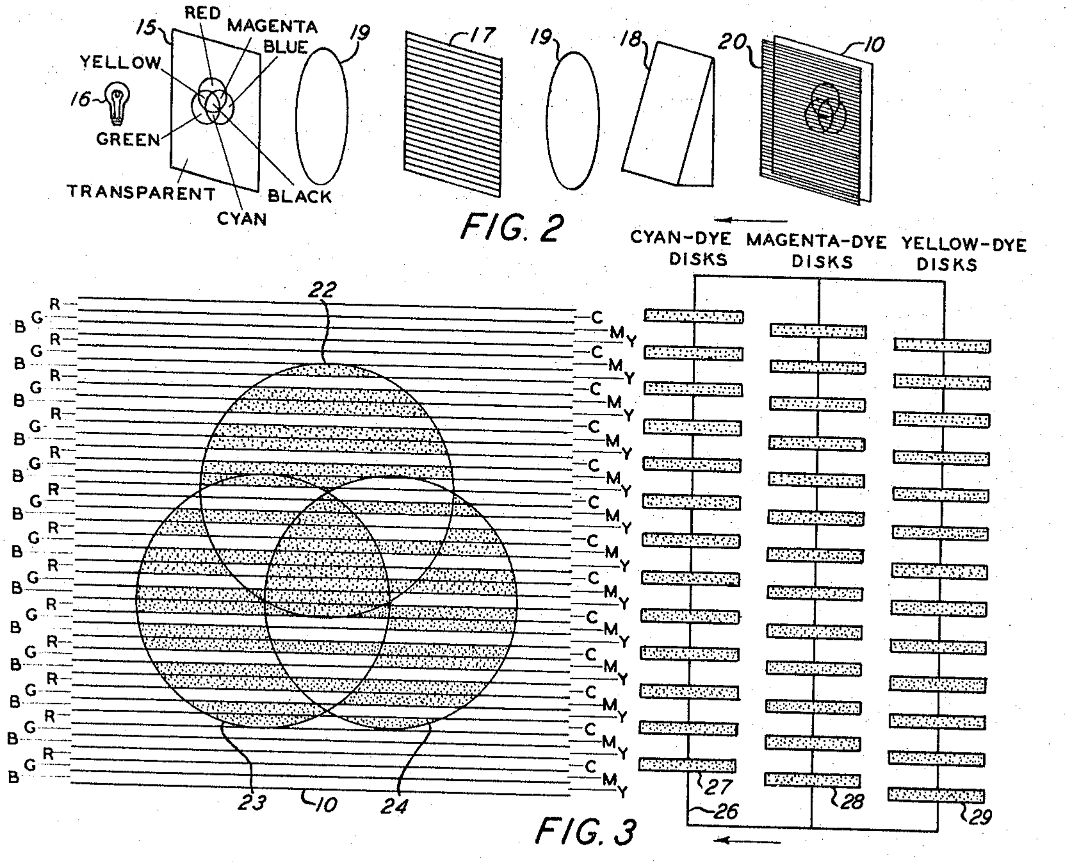
FIG. 2 FIG. 3
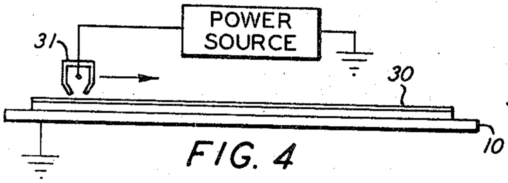
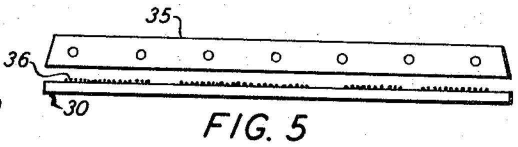
INVENTOR.
WILLIAM E. BIXBY
BY Stanley Z Cole
ATTORNEY April 11, 1967 W. E. BIXBY 3,313,623

LINE SEQUENTIAL COLOR XEROGRAPHY

Filed Sept. 5, 1961 2 Sheets-Sheet 2

INVENTOR.
WILLIAM E. BIXBY

BY Stanley Z. Cole

ATTORNEY 3,313,623

LINE SEQUENTIAL COLOR XEROGRAPHY

William E. Bixby, Deerfield, Ill., assignor, by mesne assignments, to Xerox Corporation, Rochester, N.Y., a corporation of New York Filed Sept. 5, 1961, Ser. No. 135,986
17 Claims. (Cl. 96—1.2)

This invention relates to xerography and, in particular, to xerographic color reproduction.

In the making of color prints and color transparencies, the majority of present processes use either a multiple exposure step to first obtain color separation, a multiple development step so that each color may be applied separately, or both of these together. Many processes rely on multiple layer film or paper with different layers responsive to different colors. All of these processes are extremely complex when compared to monochrome reproduction processes. The processes requiring multiple exposures and/or multiple developments have an inherent problem of image registration. In these processes, any relative movement between successive images result in an infeiror reproduction. An additional problem with multiple developments is that any slight distortion or dimensional variation of the surface being developed between one development and the next results in a distorted composite. These problems have complicated color xerographic processes and have necessitated expensive and precisely tooled xerographic color equipment.

Now, in accordance with the present invention, there is disclosed a xerographic process which produces full color reproductions using only a single exposure and a single development. These results have been obtained through unique properties of xerography which enable the formation of an image produced by a microdispersion exposure system. Previously, this exposure system has been nothing more than laboratory curiosity since no method was known of utilizing it to any commercial advantage. Now, however, methods and means are disclosed for reproducing an image in full color on a xerographic plate employing such an exposure arrangement. Thus, it is an object of the invention to reproduce a full color image by xerography using a single exposure and a single development.

It is another object of the present invention to reproduce an image from a microdispersion exposure.

It is an additional object of the invention to reproduce an image from a microdispersion exposure in full color.

It is an additional object of the invention to develop a xerographic plate in a plurality of colors in one development step.

It is an additional object of the invention to reproduce an image in full color on conventional dye transfer paper with a single transfer from a xerographic plate.

It is an additional object of the invention to define novel apparatus for reproducing an image in full color on a xerographic plate.

Further objects and features of the invention will become apparent while reading the following description in connection with the drawings wherein:

FIG. 1 is a simplified diagrammatic showing of charging a xerographic plate;

FIG. 2 is a diagrammatic illustration of a microdispersion exposure system in accordance with the invention;

FIG. 3 is a simplified diagrammatic illustration of line sequential development in accordance with the invention;

FIG. 4 is a simplified diagrammatic showing of xerographic image transfer;

FIG. 5 is a simplified diagrammatic illustration of an embodiment of diffusing apparatus for cross diffusing the lines of a developed xerographic line image; and, FIG. 6 is an isometric drawing of a rotary drum xerographic apparatus in accordance with an embodiment of the invention.

FIGS. 1 through 5 are illustrative of the basic flow steps for making a full color reproduction of a color original in accordance with the invention.

Figure 6:
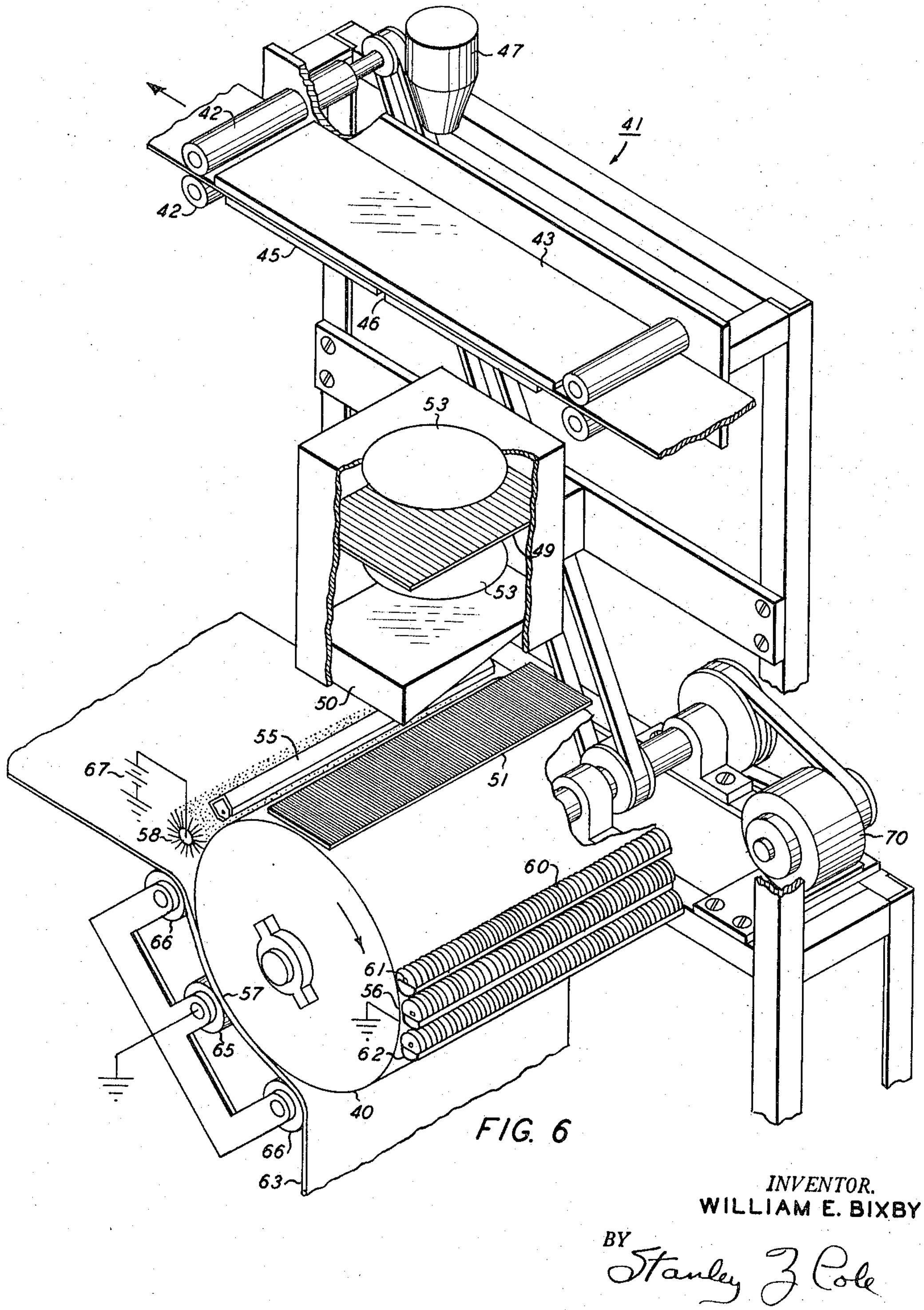

FIG. 1 illustrates charging of xerographic plate 10 by charging device 11 connected to voltage source 12. Plate 10, in order to obtain good color reproductions, is essentially panchromatic in its response characteristics. Such plates are disclosed, for example, in U.S. Patents 2,745,-327, 2,803,541, 2,803,542, and 2,937,944. Charging device 11, depicted in FIG. 1 as a corona discharge device, is shown for illustrative purposes only and it is intended to include any form of device capable of producing a uniform electrostatic charge of the desired level on the plate surface. This charge level, while it may vary considerably depending upon the xerographic plate being used and the type of development process, is generally uniform at a voltage between about 75 volts to about 750 volts and is preferably between approximately 100 and approximately 300 volts.

The charged xerographic plate 10 is then exposed in an exposure system or camera as illustrated in FIG. 2. As shown, full color original positive transparency 15 is positioned in front of light source 16 so that light, in accordance with the image, is directed toward xerographic plate 10. Between original 15 and xerographic plate 10 is positioned opaque line screen 17, prism 18 and suitable optical lenses 19. Opaque line screen 17 is a screen of alternate, clear and opaque lines. The opaque lines of screen 17 are approximately twice the width of the transparent lines. Screens useful as opaque line screens for making reproductions in a 1 to 1 size ratio should have more than about 30 lines per inch. If less lines per inch are present the end reproduction is coarse and of poor color quality. The upper limit on the other hand is brought about by limitations in the ability of the developing system to distinguish image lines as will be seen hereinafter. The preferred opaque line screen is in the nature of 100 opaque lines to the inch.

In the path of travel of illumination from source 16, opaque line screen 17 is followed by further lens 19 and prism 18. Prism 18 is designed so that a line of light corresponding to illumination through one clear line of opaque line screen 17 is converted into a spectrum, by prism 18, with edges just coinciding with the edges of the spectra formed by the lines of light passing through the adjacent clear lines of screen 17.

The microdispersion exposure system operates so that line segments of the original are dispersed into spectra which form a color banded image of the original. In accordance with the present invention, this color banded image is utilized to illuminate sensitized xerographic plate 10.

Some methods of developing electrostatic latent images are subject to contrast distortion effects and develop only a limited brightness range. In accordance with the invention, this difficulty is overcome by introducing line tone screen 20 into the exposure system between the prism and the xerographic plate. While other halftone screens may be employed, a line tone system is considered preferable.

In a preferred embodiment, line tone screen 20 is a clear plate having parallel opaque lines. The opaque lines and clear lines should be of about equal width and the number of lines should preferably be three times the number of the opaque lines in screen 17. Thus, if line screen 17 has 100 opaque lines to the inch, line tone screen 20 should have 300 lines to the inch. With this ratio of lines, line tone screen 20 will provide one line for each of three primary color image bands created by passage of light through each of the clear lines of opaque line screen 17 and the subsequent passage through prism 18. The action of this second screen is to convert differences in light intensity reaching the screen into width differences in the illuminated lines on the xerographic plate 10. To achieve this, a hard line screen would be spaced closely from the sensitive surface of the xerographic plate, or a soft line screen would be placed in contact with the sensitive surface. In a practical application of this exposure system, an initial vertical adjustment of the line tone screen 20 is made so that each of the three primary color bands, representing three primary colors, will pass through a separate transparent line of the screen.

While line tone screen 20 has been illustrated and discussed as part of a preferred embodiment of the present invention, it is to be understood that it is not necessary when development methods capable of developing continuous tones in low contrast are used.

FIG. 3 is an illustration showing development of xerographic plate 10 after exposure to a color original by a microdispersion system as illustrated in FIG. 2. To simplify explanation, xerographic plate 10 is notated in the drawing on the left side by letters indicating colors of the line spectra which illuminate the plate during exposure, and on the right side with letters indicative of complementary colors used for development. Intersecting circles are illustrated in the drawing on plate 10 to represent exposure of the plate from the original of three primary colors in intersecting circles as illustrated in FIG. 2. Thus, circle 22 represents a red exposure, circle 23 represents a green exposure and circle 24 represents a blue exposure. Frame 26 carrying three ranks of color developing disks 27, 28, and 29 is arranged so that the disks are rolled across xerographic plate 10 in register with the exposure bands of the latent electrostatic image. The developer is a particulate electroscopic material pigmented or dyed as, for instance, in the conventional colors for a subtractive process. Thus, in developing an image as described, rank of disks 27 would carry cyan colored developer material, rank of disks 28 would carry magenta colored developer material, and rank of disks 29 would carry yellow colored developer material.

The developer material may be applied in various ways. One method is to use a developer having a ferromagnetic component and developer applicating elements which have an attractive magnetism to pick up the developer by magnetic attraction and carry it to the plate surface. A liquid suspension developer can be applied by rotating disk elements which rotate through troughs containing the developer before rolling across the xerographic plate. Conventional pen point devices may also be used.

One embodiment of a rank of developer applicating elements is a cylindrical roller that is deeply scored to divide its surface into a series of disk edges with 100 edges per inch for example. Roller development with a roller is disclosed in Mayer application Ser. No. 619,379, filed Oct. 31, 1956, now abandoned, and also in U.S. Patent to Mayer 2,892,709. Development by a multi-edged roller operates in a similar manner.

Other forms of line developer elements are usable and include, for example, pen point applicator devices. Pen point developer applicators, in accordance with the invention, are positioned in a closely packed array to give the desired number of lines per inch.

In developing, as illustrated in FIG. 3, frame 26 is transported across the surface of xerographic plate 10 so that cyan color developer is applied to the bands exposed to red line spectra, magenta color developer is applied to bands exposed to green spectra lines, and the yellow color developer is applied to the bands exposed to blue spectra lines. As is illustrated, that part of circle 22 which does not intersect with the other circles attracts developer material only in the unilluminated bands; that is, the bands which would have been illuminated by green or blue, if green or blue had been in the particular area of original 15, are unexposed and still carry an attracting electrostatic charge. The bands representing red were exposed and are discharged so that no developer material is attracted in those bands. That part of circle 22 that was exposed to red light only, thus becomes developed with a combination of magenta and yellow bands. In a similar fashion, circle 23 is developed in cyan and yellow bands and circle 24 is developed in cyan and magenta bands. The intersecting areas of the circles received bands of those colors that would conventionally be applied in a subtractive process.

The color banded developed image of FIG. 3 is transferred to a transfer member as illustrated in FIG. 4. When the image bands on plate 10 have been developed with a dry colored powder developer, transfer to a transfer member may be made by the usual xerographic methods. FIG. 4 illustrates such a usual method in which transfer member 30 is placed over the image on plate 10. The nonadjacent side of the paper is then electrically charged by charging device 31. This charging device is depicted as a corona discharge electrode; however, other charging devices may be used. Other usual transfer methods include, for example, a conductive roller electrically connected to the conductive backing of xerographic plate 10 and which will induce a transfer of the image when rolled across the back of the transfer paper. When the developer is applied in the form of a liquid toner suspension, the transfer may appropriately be made while the developer is still wet. To transfer an image deposited from a liquid developer, special transfer techniques are necessary to yield high quality results. One such technique utilizes a soft highly permeable coating on the transfer member. This coating quickly absorbs the liquid toner preventing puddling or mottling effects. The use of a highly permeable coating is disclosed in application Ser. No. 790,639, of Martin, filed Feb. 2, 1959, now U.S. Patent No. 3,060,052, and its teachings are incorporated herein by reference.

While the color bands on the transfer member may appear to blend forming a full color image, the colors produced by visual blending of these bands are not as faithful to the colors of the original image as would be true if the colors were physically blended. Thus, in accordance with the present invention, the color bands are caused to diffuse laterally so that each band spreads out to blend with each of its two adjacent bands. This cross-diffusion can be achieved at the time of transfer when the image transferred is in the form of a liquid suspension. When transferring a liquid suspension image, cross-diffusion will result from using a transfer paper with a surface layer sufficiently permeable by the liquid image. A transfer paper for this purpose could be merely a highly absorbent paper but is preferably photographic stock paper with a soft gelatin coating of the desired hydrophilic characteristics.

Diffusion is obtained with certain dry images such as dye images by transferring to paper which is damp or bears a solvent for the dry image. Thus, dry dyes which are soluble in water readily diffuse to a sufficient extent when transferred in accordance with the teachings in the aforementioned Martin pending application.

When a resin powder image is transferred, cross-diffusion is achieved by one of the usual processes for liquefying a resin powder. One of these processes is illustrated in FIG. 5 in which the transfer paper, carrying the resin powder image, is exposed to a source of heat such as an infrared light source which causes the resin to liquefy and spread out. To obtain substantially greater diffusion than in conventional processes, it is preferable that the resin base used for the particulate powder image have both a low melting point and a low melt viscosity. As an alternative to heating, a powder resin image may also be liquefied by exposure to a solvent vapor. A preferred vapor for this purpose is trichloroethylene. Other solvent vapors such as amyl or butyl acetate, butyl alcohol or perchlorethylene, well known in the art, may also be used.

The invention has thus far been discussed in relation to reusable xerographic plates; however, plates of the type disclosed in U.S. Patent 2,937,944, can be of the disposable or consumable variety with the attendant omission of transfer requirements. A xerographic binder plate of the consumable variety is appropriate for line sequential color xeropgraphy, in accordance with the invention. The consumable plate is sensitized as in FIG. 1, exposed to an image as in FIG. 2, and developed as in FIG. 3. The transfer step is omitted, but the cross-diffusion is still necessary and may be by applying heat or a solvent as discussed relative to FIG. 5.

An embodiment of a complete apparatus is illustrated in FIG. 6. This apparatus utilizes a rotary drum xerographic plate 40. Facing down upon this drum is a microdispersion projection apparatus. The projection apparatus includes means for supporting and transporting an original to be reproduced generally designated 41. An original to be reproduced is transported by drive rollers 42 between transparent support shield 43 and slitted opaque shield 45. Slit 46 in the center of opaque shield 45, allows passage of illumination corresponding to a line segment of the original illuminated by light source 47. The illustrated supporting and driving means 41 is designed for use in connection with transparent originals. However, this apparatus is not intended to be limited to reproductions from transparencies. When reproduction from an opaque original is desired, illumination of such an original is obtained by reflecting illumination from the original. Illumination corresponding to a line segment of the original to be reproduced passes through opaque line screen 49, thin prism 50 and line tone screen 51 positioned between xerographic plate 40 and the original supporting means 41. These elements generally conform to those described in relation to FIG. 2. In some instances, the width of the desired reproduction is such that it becomes impractical to use a single prism of the nature depicted as prism 50. Thus, prism 50 is intended to include a sequence of smaller prisms positioned end to end and which may be separate or ground into a single optical blank. Lenses 53 are illustrated to depict appropriate lenses for the particular projection configuration. Xerographic drum plate 40 has additionally positioned around it circumference plate sensitizing station 55, developer station 56, transfer station 57, and cleaning station 58. Plate sensitizing station 55 is depicted as a corona discharge device that may be any suitable plate sensitizing means. In developer station 56 are a series of ranks of line sequential color developing elements 60. As depicted in the illustration, these elements are small disks 60 which are assembled in ranks 61 and which are bathed in troughs 62 containing a colored suspension of electroscopic particulate material. One rank of elements 60 is illustrated for each of three colors to be applied. However, depending on the nature of elements 60, it may be preferable to utilize a plurality of ranks for each color to obtain the desired spacing. Elements 60 may also be liquid developer applicators of the ball type such as used in the well known ballpoint pens. Other applicator elements may include any of the conventional penpoint devices. Transfer station 57 includes means for carrying continuous transfer web 63 into contact with the xerographic plate where image transfer inducing means 65 is positioned. Image transfer inducing means 65 is depicted as a conductive roller which is electrically referenced to the conductive backing of xerographic plate 40, but is intended to include other transfer devices such as electrostatic charging means. Additional rollers 66 are positioned to support and guide the transfer web.

Cleaning station 58 is depicted as a rotary brush which is suitably referenced by source 67 for removing residual developer from xerographic plate 40. Other cleaning means known to the art may be employed. Motor 70 is connected to drive both xerographic drum plate 40 and drive rollers 42 of the original transporting means 41 in a synchronous fashion. As is well known in the art, some such synchronous operation is necessary between a rotary drum surface to be exposed and some elements of the projection apparatus. Such other synchronous operation is intended to be included in the description of the present apparatus and may be, for example, movement of slit 46 and lenses 53 synchronous with the drum and relative to the original. In apparatus requiring movement of the slit and lenses, it is usual to have them move over a short distance and then snap back in repetitive manner.

Various other embodiments of the present invention are obvious and may be utilized not only for full color reproductions but also for black and white reproductions or reproductions in one or any plurality of colors.

While the present invention has been described as carried out in specific embodiments thereof, there is no desire to be limited thereby, but it is intended to cover the invention broadly within the spirit and scope of the appended claims.

I claim:

1. A method of xerographic color reproduction comprising projecting an illumination pattern of a color image through an opaque line screen and a prism whereby said illumination pattern is dispersed into lines representing the primary spectral components of said illumination pattern; imposing an electrostatic field across a xerographic plate and, while said field is imposed, exposing said xerographic plate to said spectral lines to form a banded latent electrostatic image; and developing said banded latent electrostatic image by applying cyan color developer to bands exposed to red line spectra, magenta colored developer to bands exposed to green line spectra, and yellow colored developer to bands exposed to blue line spectra.

2. The method of claim 1 further including the step of diffusing the developer in each of said developed bands substantially across the band immediately adjacent each side of said developed band.

3. A method of xerographic color reproduction comprising converting an illumination pattern of a colored image to be reproduced into spectra comprising lines representing the primary spectral components of said illumination pattern; imposing an electrostatic field across a xerographic plate and, while said field is imposed, focusing the primary spectral lines on said xerographic plate so that the edges of each spectra coincide with the edges of adjacent spectra thereby forming a banded latent electrostatic image on said xerographic plate, and developing each spectra with three differently colored electroscopic marking materials so that each primary colored line is developed in a separate line by a differently colored electroscopic marking material.

4. A method of xerographic color reproduction comprising projecting an illumination pattern of a colored image through an opaque line screen to produce separated line segments of said image, dispersing the light in each of said line segments to separate the spectral components of said light and form wider lines, imposing an electrostatic field across a xerographic plate and, while said field is imposed, exposing said xerographic plate to said dispersed light at about the point in the optical path where the dispersed light beams from two adjacent line segments intersect and then applying at least two differently colored xerographic developers to said plate in narrow parallel lines with each developer being applied to that portion of said plate exposed to one part of the dispersed spectrum in each line of exposure.

5. A method of xerographic color reproduction comprising projecting an illumination pattern of a colored image through an opaque line screen to form sequential line-segments, projecting said sequential line-segments through a prism whereby said sequential line-segments are dispersed to lines representing the primary spectral components of said original illumination pattern, imposing an electrostatic field across a xerographic plate and, while said field is imposed, focusing the primary spectral lines on said xerographic plate so that the edges of the spectral components of each line-segment coincide with the edges of spectral components of adjacent line-segments thereby forming a banded latent electrostatic image on said xerographic plate, and developing each spectra with three differently colored electroscopic marking materials so that each primary colored band is developed in a separate line by a differently colored electroscopic marking material.

6. The method of claim 5 wherein the step of developing each spectra comprises applying cyan colored developer to bands exposed to red line spectra, magenta colored developer to bands exposed to green line spectra, and yellow colored developer to bands exposed to blue line spectra.

7. The method of claim 5 further including the step of diffusing each of said developed bands substantially across the band immediately adjacent each side of said developed band.

8. The method of claim 5 further including the step of transferring the developed image to a transfer member having a permeable surface layer for cross-diffusing each developed band substantially across the band immediately adjacent each side of said developed band.

9. The method of claim 8 further including the step of liquefying the developed image after said transferring step to produce cross-diffusion.

10. The method of claim 5 including developing with three differently colored liquid electroscopic marking materials so that adjacent bands diffuse together.

11. A xerographic color imaging system comprising means for converting an illumination pattern from an original to be reproduced into sequential line-segments, means for dispersing said sequential line-segments into sequentially adjacent spectra comprising bands of the three primary color components, a panchromatic xerographic plate, means to impose an electrostatic field across said xerographic plate, said xerographic plate being positioned at about the point in the optical path where the edges of the spectral components of each line-segment coincide with the edges of the spectral components of adjacent line-segments thereby forming a banded latent electrostatic image on said xerographic plate, and means for developing said colored bands in a repeating trichromatic sequence across said xerographic plate.

12. The apparatus of claim 11 further including means for diffusing each of said developed bands substantially across the band immediately adjacent each side of developed band.

13. The apparatus of claim 11 wherein the means for converting the illumination pattern from an original to be reproduced into sequential line-segments is an opaque line screen and the means for converting the sequential line-segments into sequentially adjacent spectra is a prism.

14. The apparatus of claim 13 further including a line-toned screen placed intermediate said prism and said xerographic plate.

15. The apparatus of claim 14 wherein the ratio of lines per inch in said line-toned screen to lines per inch in said opaque line screen is about 3:1.

16. The apparatus of claim 11 wherein the developer means comprises a plurality of line developer elements for individual development of the three primary color bands of each spectra.

17. A xerographic color imaging system comprising an image projector, a panchromatic xerographic plate in the optical path of an illumination pattern of a colored image from said image projector, an opaque line screen in the optical path for converting said illumination pattern into sequential line-segments, a prism for dispersing said sequential line-segments into lines representing the primary spectral components of said original illumination pattern, means for applying an electrostatic field across said xerographic plate to form a banded latent electrostatic image upon exposure of said plate to said illumination pattern, said plate being positioned in said optical path where the dispersed light beams from two adjacent line-segments intersect, and means for developing said banded latent electrostatic image comprising three developer applicators each of said applicators being made up of a number of narrow edged applicator elements, said elements being spaced apart a distance equal to twice their width and said applicators being offset from each other and positioned to separately develop a primary spectral component in each of said lines.

References Cited by the Examiner

UNITED STATES PATENTS

| | | | |
|---|---|---|---|
| 2,024,522 | 12/1935 | Harrison | 96—25 |
| 2,182,993 | 12/1939 | Moreno | 96—24 |
| 2,907,674 | 10/1959 | Metcalfe | 96—1 X |
| 2,940,847 | 6/1960 | Kaprelian | 96—1 |
| 2,986,466 | 5/1961 | Kaprelian | 96—1 |
| 2,990,278 | 6/1961 | Carlson | 96—1 |
| 3,052,213 | 9/1962 | Schaffert | 118—637 |
| 3,057,720 | 10/1962 | Hayford | 96—1 |
| 3,147,699 | 9/1964 | Land | 96—1 |

OTHER REFERENCES

Friedman: History of Color Photography, pp. 23–33, Boston (1944).

Wall: "Practical Color Photography," American Photo Publishing Co., Boston, 1928, pp. 234–246.

Rydz: RCA Review, 19, pp. 465–86 (1958).

NORMAN G. TORCHIN, *Primary Examiner.*

LOUISE P. QUAST, *Examiner.*

G. H. BJORGE, C. E. VAN HORN, *Assistant Examiners.*